United States Patent
Sugimura et al.

(10) Patent No.: US 9,939,208 B2
(45) Date of Patent: Apr. 10, 2018

(54) HEAT EXCHANGER

(71) Applicant: DENSO CORPORATION, Kariya, Aichi-pref. (JP)

(72) Inventors: Ryohei Sugimura, Kariya (JP); Mitsuharu Inagaki, Kariya (JP); Mitsuyoshi Saito, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 16 days.

(21) Appl. No.: 15/126,442

(22) PCT Filed: Mar. 23, 2015

(86) PCT No.: PCT/JP2015/001614
§ 371 (c)(1),
(2) Date: Sep. 15, 2016

(87) PCT Pub. No.: WO2015/146123
PCT Pub. Date: Oct. 1, 2015

(65) Prior Publication Data
US 2017/0082381 A1    Mar. 23, 2017

(30) Foreign Application Priority Data
Mar. 24, 2014  (JP) ................. 2014-059756

(51) Int. Cl.
*F28F 9/02*    (2006.01)
*F28F 1/12*    (2006.01)
(Continued)

(52) U.S. Cl.
CPC ............. *F28F 1/128* (2013.01); *B60H 1/32* (2013.01); *F28D 1/053* (2013.01);
(Continued)

(58) Field of Classification Search
CPC .......... F28F 1/128; F28F 1/30; F28F 2215/04; F28F 2240/00; F28F 2265/14; F28F 9/02;
(Continued)

(56) References Cited

U.S. PATENT DOCUMENTS 5,538,039 A * 7/1996 Harde .................. B60K 15/035
137/592
5,992,514 A   11/1999 Sugimoto et al.
(Continued)

FOREIGN PATENT DOCUMENTS

| JP | H0674865 U | 10/1994 |
| JP | H09138084 A | 5/1997 |

(Continued)

*Primary Examiner* — Davis Hwu
(74) *Attorney, Agent, or Firm* — Harness, Dickey & Pierce, P.L.C.

(57) ABSTRACT

A heat exchanger includes: stacked tubes through which a refrigerant flows; and a fin joined to the tube to increase a heat exchange area with air flowing around the tube. A cross-section of the fin perpendicular to a flow direction of the air is shaped in a wave shape that has: planar sections substantially parallel to the flow direction of the air; and a top for connecting between the adjacent planar sections. A clearance is defined in the planar section of the fin. When a portion of the fin where the shortest distance from a center line between the adjacent planar sections becomes the maximum is set as a furthest section in a cross-section perpendicular to a stacking direction of the tubes, the clearance is defined in one furthest section or at least one of a plurality of furthest sections.

13 Claims, 12 Drawing Sheets

(51) Int. Cl.
  *F28D 1/053* (2006.01)
  *F28D 20/02* (2006.01)
  *B60H 1/32* (2006.01)
  *F28F 1/30* (2006.01)
  *F28D 20/00* (2006.01)

(52) U.S. Cl.
  CPC ......... *F28D 1/05383* (2013.01); *F28D 20/02* (2013.01); *F28F 1/30* (2013.01); *F28D 2020/0013* (2013.01); *F28F 2215/04* (2013.01); *F28F 2240/00* (2013.01); *F28F 2265/14* (2013.01); *Y02E 60/145* (2013.01)

(58) Field of Classification Search
  CPC ...... F28D 1/053; F28D 1/05383; F28D 20/02; F28D 2020/0013; F28D 1/0417; F28D 1/05391; F28D 1/0443; B60H 1/32; B60H 15/035; Y02E 60/145
  USPC ........................................................ 165/175
  See application file for complete search history.

(56) References Cited

U.S. PATENT DOCUMENTS

| | | | |
|---|---|---|---|
| 6,021,846 A * | 2/2000 | Sasaki | F28D 1/0417 165/144 |
| 6,073,686 A * | 6/2000 | Park | F28D 1/05391 165/110 |
| 6,209,628 B1 | 4/2001 | Sugimoto et al. | |
| 6,308,527 B1 | 10/2001 | Kuroyanagi et al. | |
| 7,156,162 B2 * | 1/2007 | Manaka | F28D 1/0443 165/140 |
| 7,549,465 B2 * | 6/2009 | Gong | F28F 9/02 165/150 |
| 2002/0125000 A1 | 9/2002 | Nozaki et al. | |
| 2003/0102113 A1 | 6/2003 | Memory et al. | |
| 2004/0069457 A1 | 4/2004 | Park et al. | |
| 2005/0097746 A1 | 5/2005 | Nozaki et al. | |
| 2006/0237173 A1 | 10/2006 | Okura et al. | |
| 2006/0249277 A1 | 11/2006 | Riondet et al. | |
| 2007/0084589 A1 | 4/2007 | Nishino et al. | |

FOREIGN PATENT DOCUMENTS

| | | |
|---|---|---|
| JP | H10141805 A | 5/1998 |
| JP | H10231724 A | 9/1998 |
| JP | H10253276 A | 9/1998 |
| JP | H11159987 A | 6/1999 |
| JP | 2000179988 A | 6/2000 |
| JP | 2001059690 A | 3/2001 |
| JP | 2001317894 A | 11/2001 |
| JP | 2002195774 A | 7/2002 |
| JP | 2002228379 A | 8/2002 |
| JP | 3358380 B2 | 12/2002 |
| JP | 3469412 B2 | 11/2003 |
| JP | 3709611 B2 | 10/2005 |
| JP | 2007010176 A | 1/2007 |
| JP | 2007113802 A | 5/2007 |
| JP | 4041654 B2 | 1/2008 |
| JP | 2008309373 A | 12/2008 |
| JP | 4459062 B2 | 4/2010 |
| JP | 4683987 B2 | 5/2011 |

* cited by examiner

W=0.414×Fp+0.0575

HEAT EXCHANGER

CROSS REFERENCE TO RELATED APPLICATIONS

This application is a U.S. National Phase Application under 35 U.S.C. 371 of International Application No. PCT/JP2015/001614 filed on Mar. 23, 2015 and published in Japanese as WO 2015/146123 A1 on Oct. 1, 2015. This application is based on and claims the benefit of priority from Japanese Patent Application No. 2014-059756 filed on Mar. 24, 2014. The entire disclosures of all of the above applications are incorporated herein by reference.

TECHNICAL FIELD

The present disclosure relates to a heat exchanger.

BACKGROUND ART

Conventionally, an evaporator of an air conditioner for a vehicle includes: a tube through which a refrigerant flows; and a fin which is joined to the tube to increase a heat exchange area between air flowing around the tube and the refrigerant (for example, see Patent Literature 1).

In such an evaporator, when a surface temperature falls below a freezing point, a freeze fracture possibly occurs, in which condensed water adhered to a surface of the evaporator freezes, causing volume expansion and fractures of the peripheral tube and the peripheral fin.

To handle this, temperature control of the evaporator is executed by using a thermistor in the conventional air conditioner for a vehicle. Accordingly, when a temperature of the evaporator becomes a reference temperature or lower, a refrigeration cycle is stopped, or a heat load is reduced. In this way, the condensed water that is adhered to the surface of the evaporator does not freeze, or the condensed water only freezes to such an extent that the freeze fracture does not occur.

PRIOR ART LITERATURES

Patent Literature
  Patent Literature 1: JP 3469412 B2

SUMMARY OF INVENTION

However, in recent years, like an outdoor heat exchanger that functions as an evaporator for exchanging heat of a low-pressure refrigerant with ambient air to cause evaporation thereof in a heat pump cycle, a need for use of the heat exchanger under such an environment that the surface temperature falls below the freezing point is growing. In this case, the freeze fracture is difficult to be dealt with by the temperature control for the evaporator as described above.

The present disclosure has a purpose of providing a heat exchanger capable of restricting occurrence of a freeze fracture.

According to an aspect of the present disclosure, a heat exchanger includes: a plurality of tubes stacked with each other; and a fin joined to the tubes. A first fluid flows through each of the tubes, and the fin increases a heat exchange area with a second fluid flowing around the tubes. A cross-section of the fin perpendicular to a flow direction of the second fluid has a wave shape that has: a plurality of planar sections substantially parallel to the flow direction of the second fluid; and a top for connecting between the adjacent planar sections. While a surface temperature of at least one of the tube and the fin possibly becomes a freezing point or lower, a clearance is defined in the planar section of the fin. When a portion of the fin where a shortest distance from a center line between the adjacent planar sections becomes the maximum is set as a furthest section in a cross-section of the fin that is perpendicular to a stacking direction of the tubes, the clearance is defined in one furthest section or at least one of a plurality of furthest sections.

In a heat exchanger in which a surface temperature of at least one of a tube and a fin possibly becomes a freezing point or lower, when a liquid, such as condensed water (water or a water-containing material) adhered to the tube or the fin, freezes, freezing progresses from a peripheral edge section of the liquid, and a central section freezes at the end. Accordingly, a portion, freezing of which is completed at the end, (hereinafter, referred to as a final freezing section) is enclosed by a freezing section, freezing of which has already been completed. In such a case, a load is applied to the peripheral tube or the peripheral fin in conjunction with volume expansion by freezing. In this way, the freezing fracture possibly occurs to the tube or the fin.

To deal with this, a clearance is provided in a planar section of the fin. In this way, the load that is associated with the volume expansion by freezing of the final freezing section (hereinafter, referred to as a freezing load) can be released from the clearance. Furthermore, in a cross section of the fin that is perpendicular to a stacking direction of the tubes, the clearance is provided in the furthest section, in which the shortest distance from a center line between the adjacent planar sections becomes the maximum. In this way, the freezing load can be released from a portion of the fin where the freezing load becomes the maximum, and thus occurrence of the freeze fracture to the tube or the fin can be restricted.

According to an aspect of the present disclosure, a heat exchanger for a heat pump cycle includes: a plurality of stacked tubes, through each of which a first fluid flows; and a fin joined to the tubes to increase a heat exchange area with a second fluid flowing around the tube. The fin has: plural planar sections substantially parallel to a flow direction of the second fluid; and a top for connecting between the adjacent planar sections so as to present a wave shape. The planar section has louvers that are cut and raised at a predetermined cutting and raising angle with respect to the planar section and that are arranged in the flow direction of the second fluid. The plural louvers have: a first louver group that includes plural first louvers; and a second louver group that is arranged on a downstream side of the first louver group in the flow direction of the second fluid. The louvers of the second louver group are cut and raised in a different cutting and raising direction different from the louvers of the first louver group. At least one deflecting section for changing the flow direction of the second fluid is provided in a portion of the planar section that is located between the first louver group and the second louver group. At least one clearance for communicating between adjacent air passages that are partitioned by the planar section is provided in the at least one deflecting section.

In this way, the freezing load can be released from the portion of the fin where the freezing load becomes the maximum, and thus the occurrence of the freeze fracture to the tube or the fin can be restricted.

DESCRIPTION OF EMBODIMENTS

Figure 1:
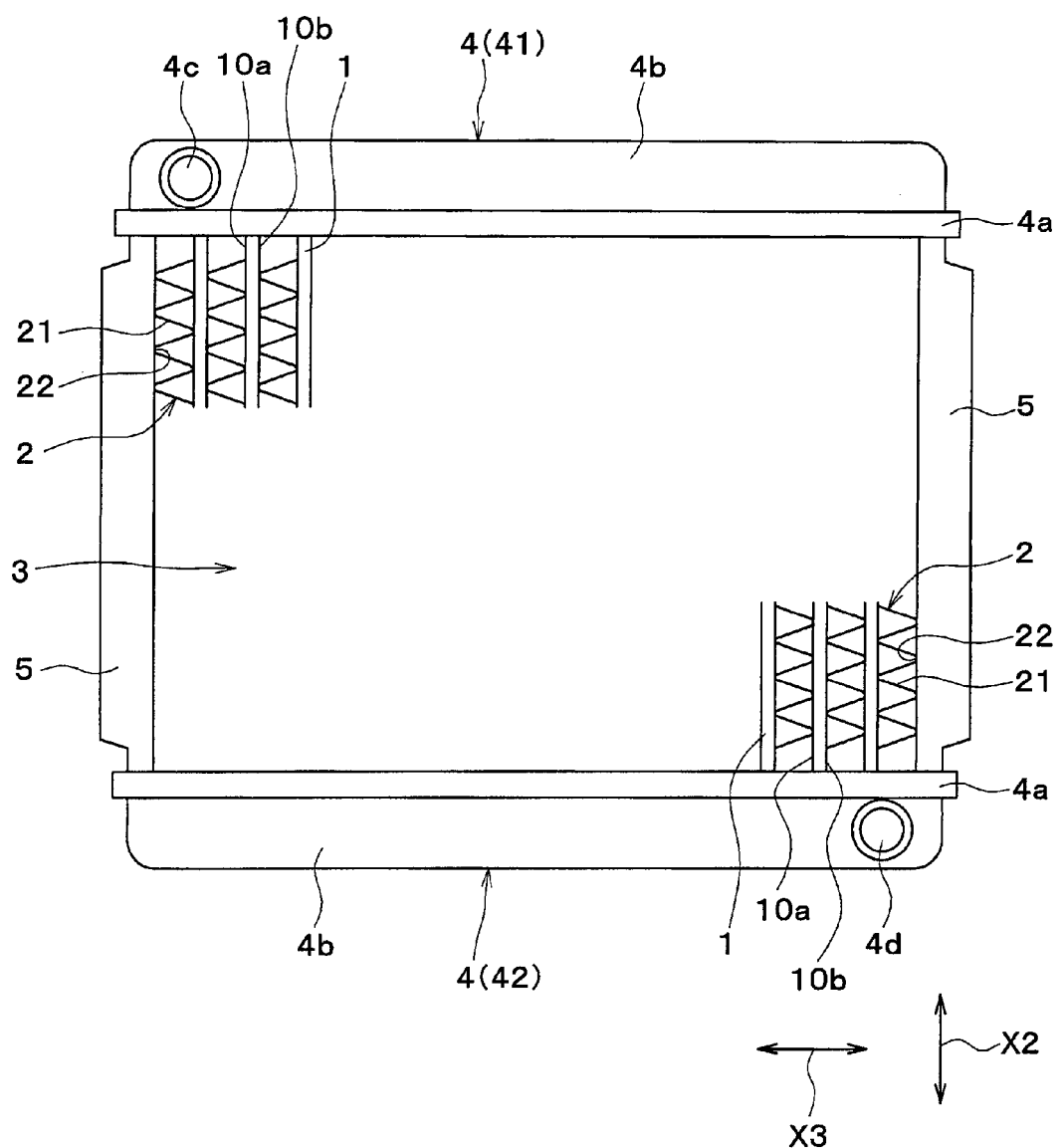
FIG. 1 is a front view illustrating an outdoor heat exchanger according to a first embodiment.

Hereinafter, embodiments will be described according to the drawings. Same or equivalent portions among respective embodiments below are labeled with same reference numerals in the drawings.

First Embodiment

A description will be made on a first embodiment on the basis of FIG. 1 to FIG. 11. In the present embodiment, a heat exchanger according to the present disclosure is applied to an outdoor heat exchanger that functions as an evaporator for exchanging heat of a low-pressure refrigerant with ambient air to cause evaporation thereof in a heat pump cycle.

As depicted in FIG. 1, the outdoor heat exchanger is a downflow-type heat exchanger in which a refrigerant (a first fluid) as an internal fluid flows in a vertical direction. The outdoor heat exchanger includes a tube 1 through which the refrigerant flows.

The tube 1 is provided to have a flat oval shaped (flat shaped) cross section that is perpendicular to a longitudinal direction such that a long diameter direction corresponds to a flow direction of air (a second fluid) as an external fluid (hereinafter, referred to as an airflow direction X1). The plural tubes 1 are arranged to be parallel in a horizontal direction such that the longitudinal direction thereof corresponds to the vertical direction. In the present embodiment, a microporous tube that is formed by extruding is adopted as the tube 1.

The tube 1 has two flat surfaces 10a, 10b that oppose each other through a fluid passage, through which the refrigerant flows in the tube 1. Fins 2 as heat transfer members, which are molded in wave shapes, are respectively joined to the flat surfaces 10a, 10b on both sides of the tube 1. A heat transfer area with the air is increased by the fin 2 so as to promote heat exchange between the refrigerant and the air. Thus, the tube 1 corresponds to a heat exchange object of the present disclosure. A substantially rectangular heat exchange section that includes the tubes 1 and the fins 2 is referred to as a core section 3.

At ends (upper and lower ends in the present embodiment) of the tube 1 in the longitudinal direction (hereinafter, referred to as a tube longitudinal direction X2), header tanks 4 extend in a direction (a horizontal direction in the present embodiment) that is perpendicular to the tube longitudinal direction X2, and communicate with the plural tubes 1. The header tank 4 is configured by including: a core plate 4a to which the tubes 1 are inserted and joined; and a tank main body section 4b that constitutes an internal tank space with the core plate 4a. In the present embodiment, the core plate 4a and the tank main body section 4b are made of metal (for example, an aluminum alloy). In addition, each end of the core section 3 is provided with an insert 5 that extends substantially parallel to the tube longitudinal direction X2 and reinforces the core section 3.

Of the two header tanks 4, an inlet-side tank 41, which is arranged on an upper side and allows the refrigerant to diverge into the tube 1, has the tank main body section 4b which is provided with an inlet pipe 4c for causing the refrigerant to flow into the tank main body section 4b. In addition, of the two header tanks 4, an outlet-side tank 42, which is arranged on a lower side and collects the refrigerant flowing out of the tube 1, has the tank main body section 4b which is provided with an outlet pipe 4d for causing the refrigerant, which has been cooled by the heat exchange with the air, to flow out thereof.

Figure 2:
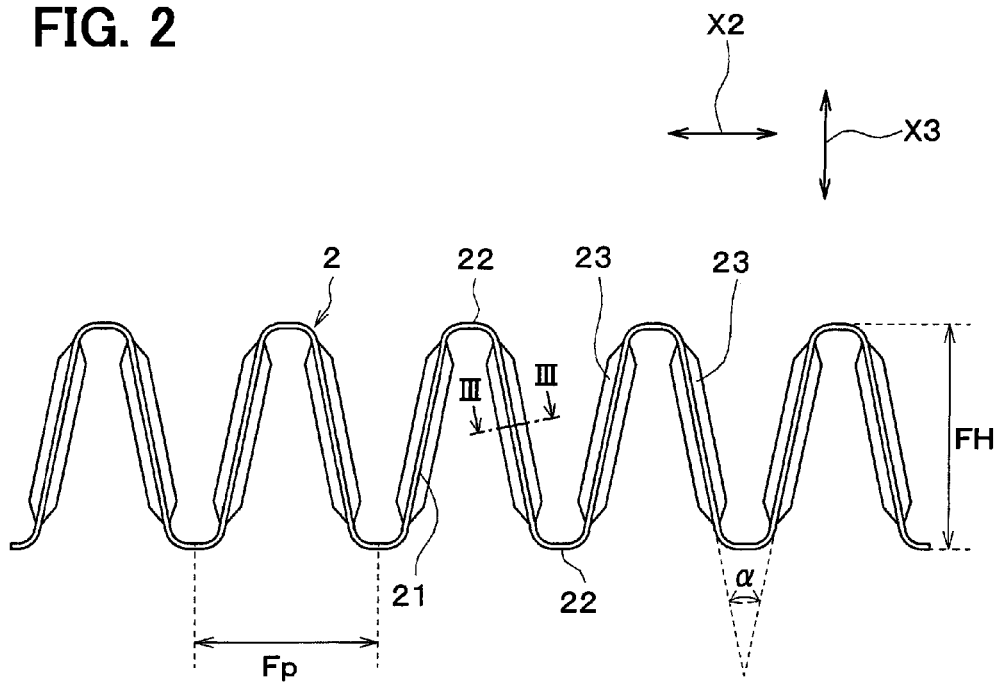
FIG. 2 is a front view illustrating a fin according to the first embodiment.

As depicted in FIG. 2, the fin 2 is a corrugated fin that is formed in a wave shape and has: plate-shaped plate sections 21; and tops 22, each of which positions and separates the adjacent plate sections 21 by a predetermined distance. The plate section 21 provides a surface that expands along the airflow direction X1. The plate section 21 can be provided by using a flat plate and will also be referred to as a planar section 21 in the following description.

The top 22 has a top plate section in a flat plate shape that provides a narrow flat surface facing the outside. A bent section, which is substantially at a right angle, is provided between the top plate section and the planar section 21. The top plate section is joined to the tube 1, and the fin 2 and the tube 1 are thereby joined to allow heat transfer therebetween. The top 22 can be seen as a curved section that is curved as a whole when the top plate section is provided to have sufficiently narrow width and the bent section has a large radius. Thus, the top 22 will also be referred to as a curved section 22 in the following description.

In the present embodiment, the wave shape fin 2 is molded by applying a roller molding method to a thin-plate metallic material. The curved sections 22 of the fin 2 are joined to the flat surfaces 10a, 10b of the tube 1 by brazing.

Figure 3:
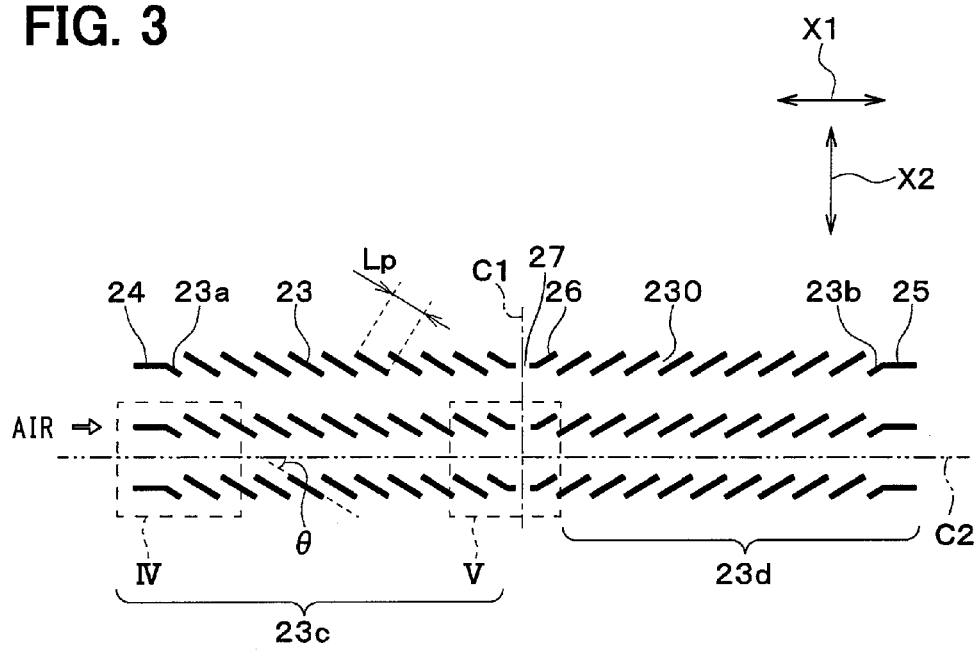
FIG. 3 is a cross-sectional view taken along a line III-III of FIG. 2.
Figure 4:
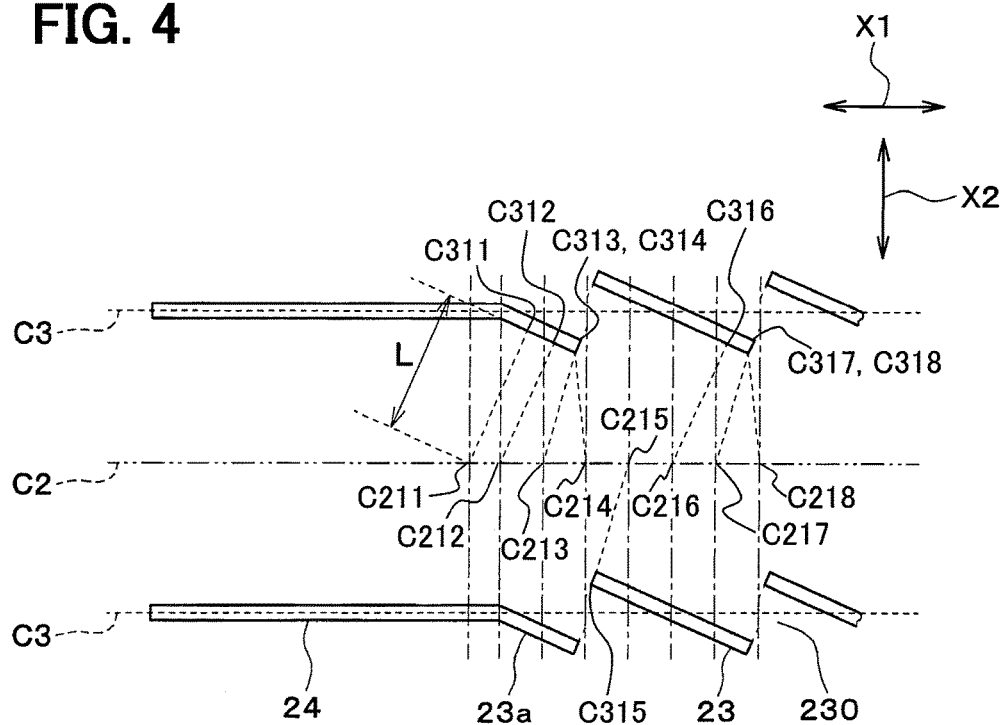
FIG. 4 is an enlarged view of an area IV of FIG. 3.
Figure 5:
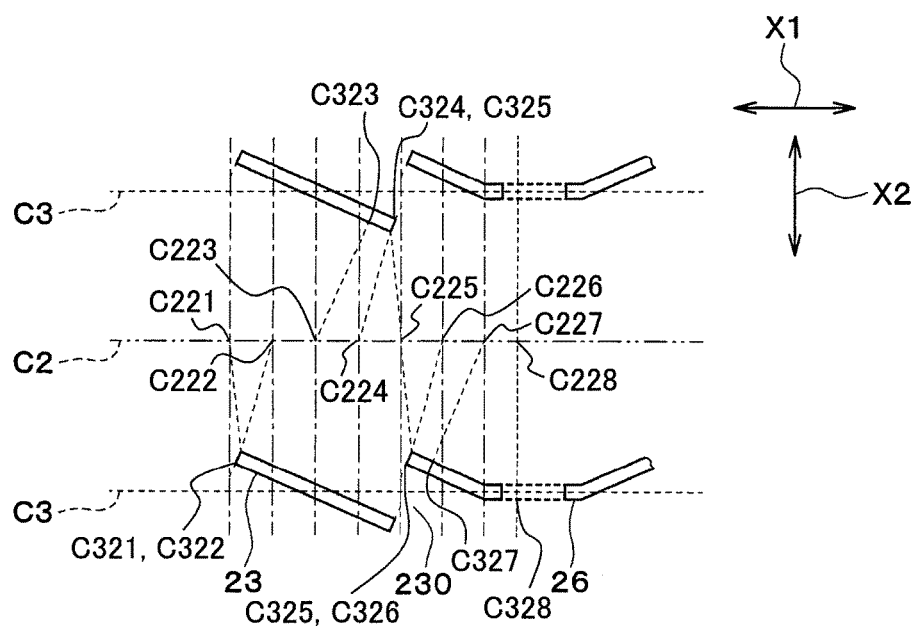
FIG. 5 is an enlarged view of an area V of FIG. 3.

As depicted in FIG. 3, FIG. 4, and FIG. 5, in the planar section 21 of the fin 2, louvers 23 in jalousie window shapes are integrally formed by cutting and raising the planar section 21. When seen from a stacking direction of the tube 1 (hereinafter, referred to as a tube stacking direction X3), the louvers 23 are cut and raised at a predetermined angle with respect to the planar section 21, and a plurality thereof is provided in the planar section 21 along the airflow direction X1. A passage 230 between the louvers, through which the air can flow, is provided between the adjacent louvers 23.

In the present embodiment, as depicted in FIG. 3, the plural louvers 23, which are provided in the one planar section 21, are divided into: an upstream louver group 23c (a first louver group) that includes plural first louvers 23 located on an upstream side in the airflow; and a downstream louver group 23d (a second louver group) that includes plural second louvers 23 located on a downstream side in the airflow. A direction in which the louvers 23 belonging to the upstream louver group 23c are cut and raised differs from a direction in which the louvers 23 belonging to the downstream louver group 23d are cut and raised. More specifically, the upstream louver group 23c and the downstream louver group 23d are provided such that the directions, in which the louvers 23 belonging thereto are cut and raised, are reversed.

An end on the airflow upstream side of the planar section 21 is an upstream-side planar section 24 that is not provided with the louver 23. Similarly, an end on the airflow downstream side of the planar section 21 is a downstream-side planar section 25 that is not provided with the louver 23.

A substantially central section of the planar section 21 in the airflow direction X1, that is, a portion between the upstream louver group 23c and the downstream louver group 23d is not provided with the louver 23 and is configured as a deflecting section 26 where the airflow direction is reversed. In other words, the deflecting section 26, which is provided to be substantially parallel to the airflow direction X1, is provided between the upstream louver group 23c and the downstream louver group 23d. Via the deflecting section 26, the directions, in which the louvers 23 belonging to the upstream louver group 23c and the downstream louver group 23d are cut and raised, are reversed.

Of the plural louvers 23, an upstream end louver 23a, which is arranged on an uppermost stream side in the airflow, is connected to the upstream-side planar section 24. Meanwhile, of the plural louvers 23, a downstream end louver 23b, which is arranged on a lowermost stream side in the airflow, is connected to the downstream-side planar section 25.

The same number of the louvers 23 are disposed on the airflow upstream side and the airflow downstream side of the deflecting section 26. In the present embodiment, the plural louvers 23 are arranged to be symmetrical about a center line (an imaginary line) C1 of the planar section 21 in the airflow direction.

In FIG. 3, FIG. 4, and FIG. 5, a two-dot chain line indicates a center line (an imaginary line) C2 between the adjacent planar sections 21 in a cross section of the fin 2 that is perpendicular to the tube stacking direction X3. In addition, in FIG. 4 and FIG. 5, a broken line indicates a center line (an imaginary line) C3 in a plate thickness direction of the fin 2. In FIG. 4 and FIG. 5, plural one-dot chain lines are imaginary lines that are parallel to the tube longitudinal direction X2. In FIG. 4, in the cross section of the fin 2 that is perpendicular to the tube stacking direction X3, the shortest distance from the center line C2 between the adjacent planar sections 21 is set as L. At this time, a portion of the louver 23 whose distance from a point C211 on the center line C2 becomes the shortest distance L is indicated as C311. Similarly, in FIG. 4, portions of the louvers 23 that have the shortest distance L with respect to points C212 to C218 on the center line C2 are sequentially denoted by C312 to C318 from the upstream side in the airflow. Also, in FIG. 5, similar to FIG. 4, the center line C2 is denoted by points C221 to C228, and portions of the louver 23 and the deflecting section 26 that have the shortest distance L from the points C221 to C228 are respectively denoted by C321 to C328. In other words, in FIG. 4 and FIG. 5, the center line (the imaginary line) C2, which is between the adjacent planar sections 21 and indicated by the two-dot chain line, intersects the imaginary lines, which are parallel to the tube longitudinal direction and are indicated by the one-dot chain lines, at intersections C211 to C228, and positions on the fin 2 with the shortest distance L at the intersections C211 to C228 are indicated as C311 to C328.

Figure 6:
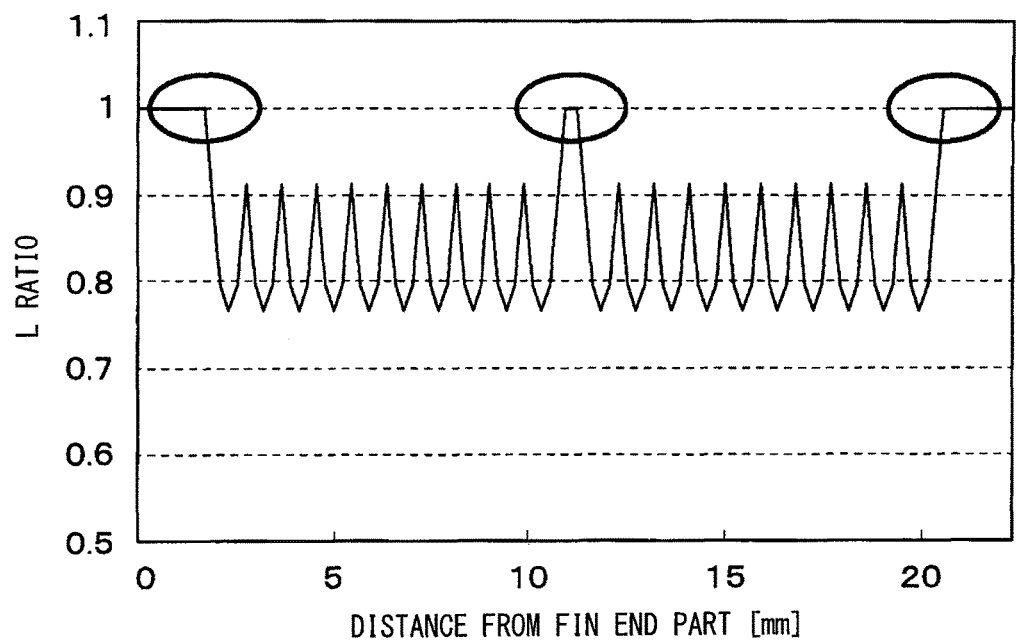
FIG. 6 is a characteristic view illustrating a relationship between a shortest length L and a distance from an end of the fin upstream in an air flow.
Figure 7:
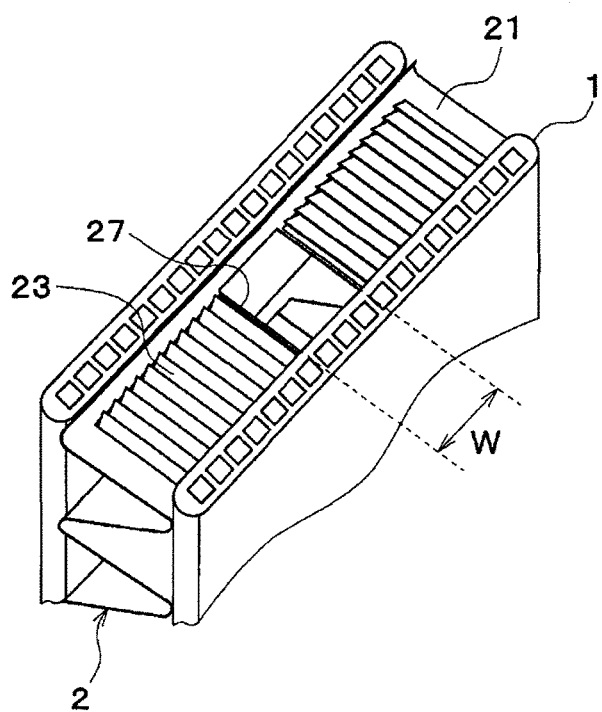
FIG. 7 is an enlarged perspective view illustrating the outdoor heat exchanger of the first embodiment.

In a cross section that is perpendicular to a plate surface of the planar section 21, the shortest distance from the center line C2 between the adjacent planar sections 21 is set as L. A relationship between a distance from the airflow upstream side end of the fin 2 and the shortest distance L in this case is depicted in FIG. 6. An L ratio that is indicated by a vertical axis in FIG. 6 is a value of the shortest distance L in a case where the maximum shortest distance L of the fin 2 is expressed as 1.

As depicted in FIG. 6, the shortest distance L becomes the maximum at the upstream-side end, the downstream-side end, and the central section of the planar section 21 of the fin 2 in the airflow direction. In other words, the shortest distance L becomes the maximum in the upstream-side planar section 24, the downstream-side planar section 25, and the deflecting section 26 of the planar section 21. Accordingly, the upstream-side planar section 24, the downstream-side planar section 25, and the deflecting section 26 of the present embodiment correspond to the furthest sections of the present disclosure.

In the present embodiment, of the portions of the planar section 21 (the upstream-side planar section 24, the downstream-side planar section 25, and the deflecting section 26) in which the shortest distance L becomes the maximum, the deflecting section 26 has a slit 27. At this time, the slit 27 is provided in the farthest portion from an upstream-side end and a downstream-side end of the tube 1 in the airflow direction X1.

The slit 27 is formed by cutting the planar section 21 from the one curved section 22 toward the other curved section 22, both of which are adjacent to the planar section 21. The slit 27 is provided to have a substantially rectangular shape when seen in a top view (in a state of being seen in the tube longitudinal direction X2). When seen in the tube stacking direction X3, the slit 27 overlaps the tube 1. In the present embodiment, the fin 2 is provided such that an upstream side and a downstream side thereof in the airflow direction X1 have symmetrical shapes about the slit 27.

A clearance is provided in the fin 2 by providing the slit 27. Accordingly, the slit 27 of the present embodiment corresponds to the clearance of the present disclosure. Hereinafter, length of the slit 27 in the airflow direction X1 is referred to as slit width (clearance width) W. In the present embodiment, the slit width W is larger than a diameter of an inscribed circle in a space between the tube 1 and the fin 2.

Figure 8:
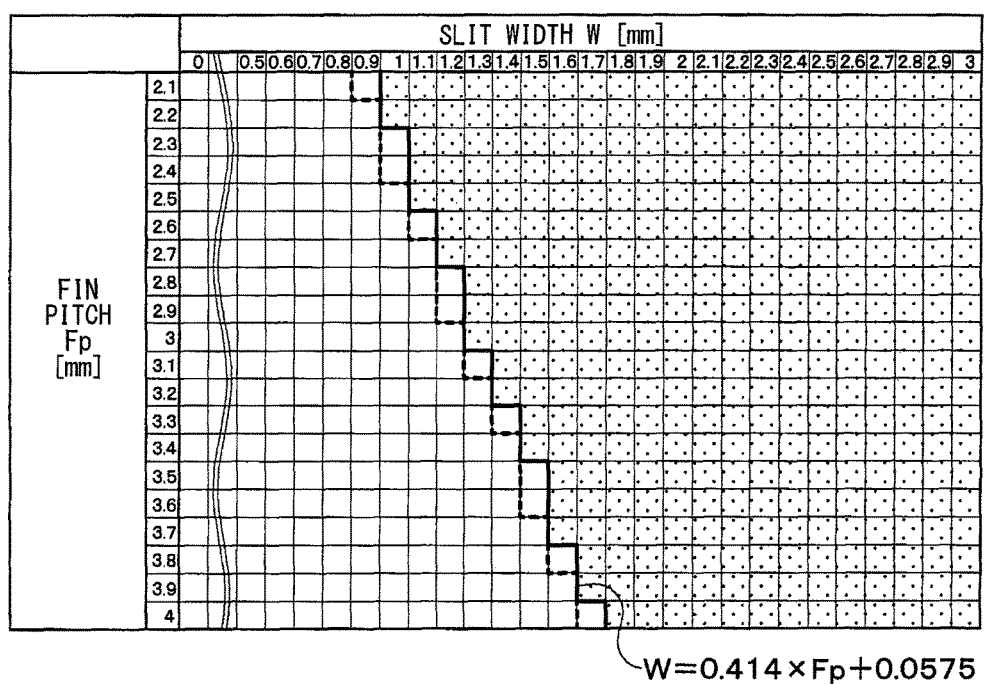
FIG. 8 is a characteristic view illustrating an analysis result of a freezing state in a case where a fin pitch Fp and a slit width W are changed.

The inventor analyzed a freezing state in a case where a fin pitch Fp (see FIG. 2) and the slit width W of the fin 2 were changed. An analysis result is depicted in FIG. 8.

Figure 9:
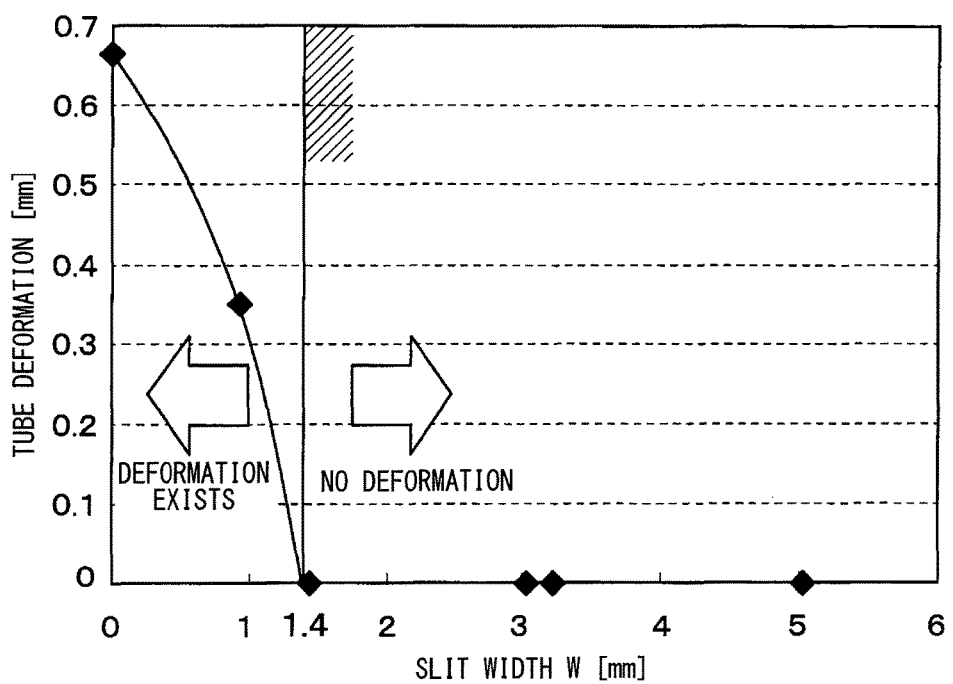
FIG. 9 is a characteristic view illustrating a relationship between the slit width W and a tube deformation.

As specific analysis conditions, a temperature of a wall surface boundary on the air (the ambient air) side was 15° C., thermal conductivity thereof was 5 W/m²K (corresponding to natural convection), a temperature of a wall surface boundary on the refrigerant side was −8° C., and thermal conductivity thereof was ∞W/m²K. As depicted in FIG. 9, the slit width W was changed while the fin pitch Fp remained constant. An amount of deformation of the tube 1 during freezing of condensed water was measured, and a result thereof is depicted in FIG. 8. In a region on a left side of a bold broken line in FIG. 8, it is indicated that the tube 1 is deformed. In a region on a right side of the bold broken line in FIG. 8, no deformation of the tube 1 is indicated.

Figure 10:
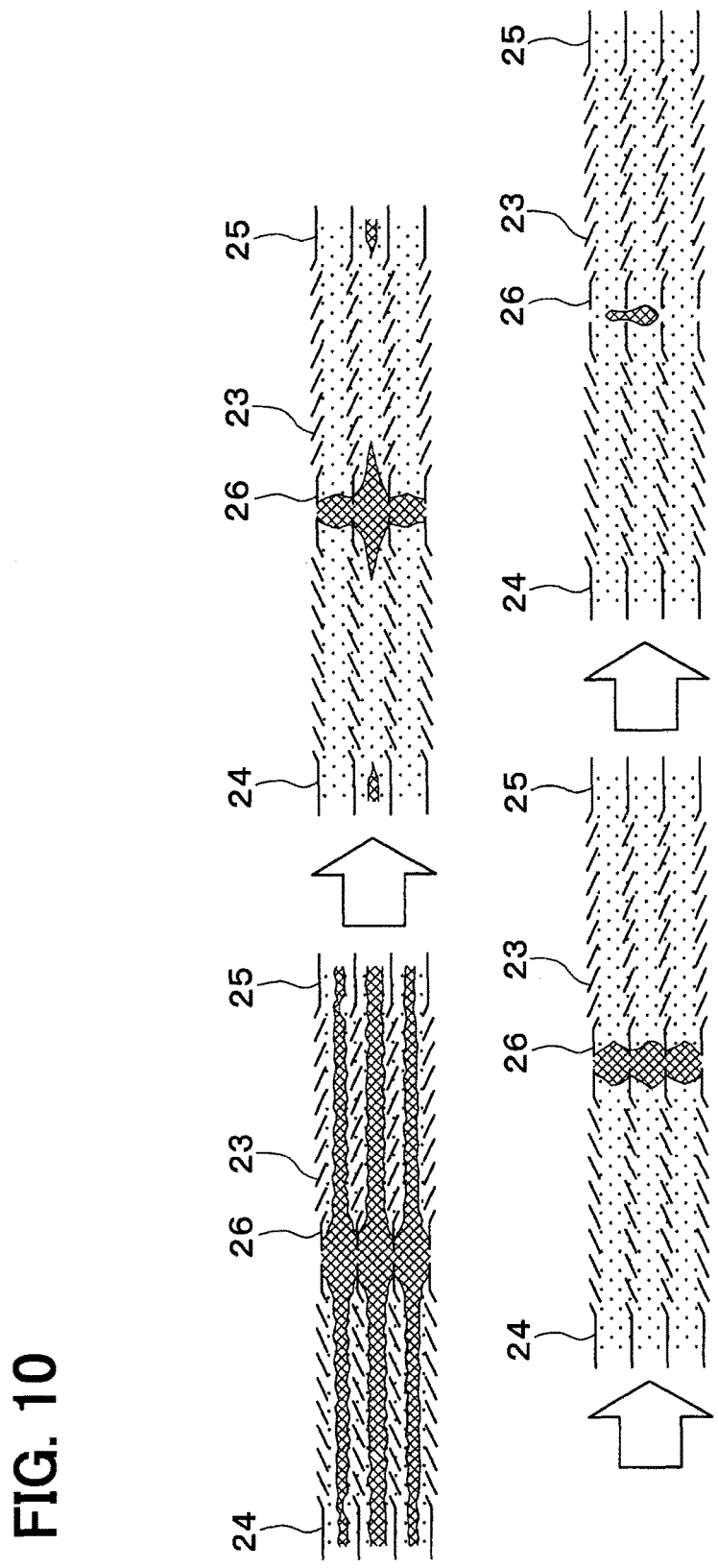
FIG. 10 is an explanatory view illustrating an analysis result of a freezing sequence in a case where a closure occurs during freezing.
Figure 11:
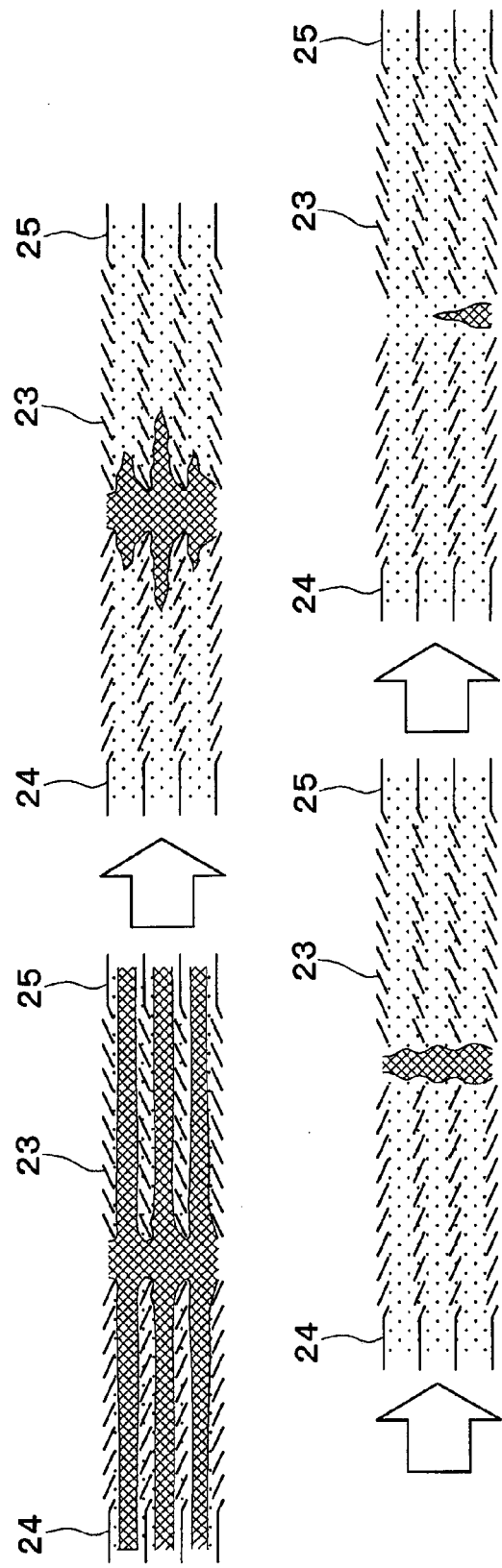
FIG. 11 is an explanatory view illustrating an analysis result of a freezing sequence in a case where a closure does not occur during freezing.

FIG. 10 depicts an analysis result of a freezing sequence in a case where closure, which will be described below, occurs during freezing. In FIG. 10 and FIG. 11, which will be described below, a freezing section is indicated by dots, and a non-freezing section (a region where non-freezing condensed water exists) is indicated by crosshatch.

As depicted in FIG. 10, when the low-pressure refrigerant at 0° C. or lower (at a freezing point or lower) flows through the tube 1, water vapor in the atmosphere is condensed and freezes in the portion between the adjacent planar sections 21 of the fin 2. Freezing progresses from the fin 2 as a heat transfer component in a manner to gradually expand like contours in a map along a surface of the fin 2. In the present embodiment, freezing progresses from ends in the tube longitudinal direction X2 of the louvers 23 with the shortest distance L (the portions whose L ratios are small in FIG. 6). When freezing progresses just as described, the non-freezing condensed water remains in the furthest section as the portion where the shortest distance L becomes the maximum (the deflecting section 26 in the present embodiment). While outer sides are brought into freezing states, the non-freezing condensed water exists on the inside.

A circumstance where the portion around the non-freezing condensed water freezes in a state where the non-freezing condensed water exists on the inside will hereinafter be referred to as closure. When the closure occurs during freezing, a load is applied to the fin 2 and the tube 1 due to volume expansion, which occurs when the non-freezing condensed water remaining on the inside freezes. As a result, the fin 2 and the tube 1 are deformed to cause a crack, which further leads to leakage of the refrigerant.

Meanwhile, FIG. 11 depicts an analysis result of a freezing sequence in a case where the closure does not occur during freezing. As depicted in FIG. 11, when the slit width W is large, the closure does not occur during freezing. In this state, even when the non-freezing condensed water freezes and the volume thereof expands, the load thereof can be released to an atmosphere release side (the outside on the atmosphere side). Thus, the deformation of the tube 1 can be restricted.

In FIG. 8, the closure occurs during freezing in the region on the left side of the bold broken line; however, the closure does not occur during freezing in the region on the right side of the bold broken line. Accordingly, by establishing such a relationship where the fin pitch Fp and the slit width W are located in the region on the right side of the bold broken line in FIG. 8, the deformation of the tube 1, which is caused by the closure during freezing, can be restricted.

In the case where the condensed water is not adhered to the surface of the fin 2 in the first place at the time when the surface temperature of the tube 1 or the fin 2 becomes 0° C. or lower (the freezing point or lower), the deformation of the tube 1 and the fin 2, which is caused by freezing of the condensed water, can be prevented.

In a region on a right side of a bold sold line in FIG. 8, the slit width W of the slit 27, which is provided in the fin 2, is large. Thus, the condensed water can be discharged to the lower side in the vertical direction. On the other hand, in a region on a left side of the bold solid line in FIG. 8, the slit width W of the slit 27 is small. Thus, the condensed water cannot be discharged.

For this reason, in the present embodiment, the slit width W is set to fall within the region on the right side of the bold solid line in FIG. 8. More specifically, the slit width W (unit: mm) and the fin pitch Fp (unit: mm) are set to satisfy a relationship of W>0.414×Fp+0.0575.

More specifically, the slit width W is set to satisfy following Equation 1.

$$W \geq \frac{1.8a^2 \times \sin\alpha}{(2a+b)} - Lp \times \sin\theta \quad \text{[Equation 1]}$$

Here, α (unit: °) indicates a fin angle as an angle defined by the two planar sections 21 of the fin 2, which are connected to the one curved section 22, and FH (unit: mm) indicates fin height as length of the fin 2 in the tube stacking direction X3. In addition, θ (unit: °) indicates the cutting and raising angle of the louver 23, and Lp (unit: mm) indicates length of the louver 23, that is, an average value of the length of the louver 23 along a flow direction of the air flowing on the surface of the louver 23. Furthermore, "a" indicates following Equation 2, and "b" indicates following Equation 3.

$$a = \sqrt{\left(\frac{Fp}{4} + \frac{FH}{2} \times \tan\frac{\alpha}{2}\right)^2 + \left(\frac{FH}{2} + \frac{Fp}{4} \times \frac{1}{\tan\frac{\alpha}{2}}\right)^2} \quad \text{[Equation 2]}$$

$$b = \frac{Fp}{2} + FH \times \tan\frac{\alpha}{2} \quad \text{[Equation 3]}$$

A portion of the fin 2 where the condensed water is possibly accumulated on the surface thereof is referred to as a water retention section. Because the outdoor heat exchanger of the present embodiment is the downflow-type heat exchanger, the condensed water moves to the lower side of the fin 2 in the vertical direction due to gravity. Thus, the water retention section is located on the lower side of the fin 2 in the vertical direction. In addition, of the plural planar sections 21 of the fin 2, the planar sections 21 in a range from the lowest side to the above the water retention section are each provided with the slit 27.

As it has been described so far, the freezing load can be released from the slit 27 by providing the slit 27 in the planar section 21 of the fin 2. Furthermore, in the present embodiment, in the cross section of the fin 2 that is perpendicular to the tube stacking direction X3, the slit 27 is provided in the portion where the shortest distance L from the center line C2 between the adjacent planar sections 21 becomes the maximum. According to this, because the freezing load can be released from the portion of the fin 2 where the freezing load becomes the maximum, occurrence of the freeze fracture in the tube 1 or the fin 2 can be restricted.

As depicted in FIG. 10 and FIG. 11, the non-freezing condensed water is likely to exist in the deflecting section 26 during freezing of the condensed water. Thus, the deflecting section 26 is a portion where the freezing load becomes the maximum in the planar section 21. In addition, the deflecting section 26 exists in a central section of the core section 3 in the airflow direction X1, and the central section of the core section 3 in the airflow direction X1 is a portion where the amount of the deformation of the tube 1 by the freezing load becomes the maximum.

To deal with the above, in the present embodiment, the slit 27 is provided in the farthest portion from each of the upstream-side end and the downstream-side end of the tube 1 in the airflow direction X1, that is, in the deflecting section 26 as the central section in the airflow direction X1. Thus, the freezing load can be released from the portion of the planar section 21 where the tube 1 is most likely to be fractured at a time when the freezing load is applied thereto.

In addition, in the present embodiment, the fin 2 is provided such that the upstream side and the downstream side thereof in the airflow direction X1 have the symmetrical shapes about the slit 27. According to this, moldability of the fin 2 can be improved.

Furthermore, in the present embodiment, the outdoor heat exchanger is the downflow-type heat exchanger, and the slit 27 is provided in each of the planar sections 21 of the fin 2 in the range from the lowest side to the above the water retention section of the planar section 21. According to this, the slit 27 is provided in the water retention section of the fin 2, that is, the portion where the condensed water is possibly adhered. Therefore, the occurrence of the freeze fracture to the tube 1 and the fin 2 can reliably be restricted.

Second Embodiment

A description will be made on a second embodiment on the basis of FIG. 12. The second embodiment differs from the above first embodiment in a point that a through hole 28 is provided instead of the slit 27.

Figure 12:
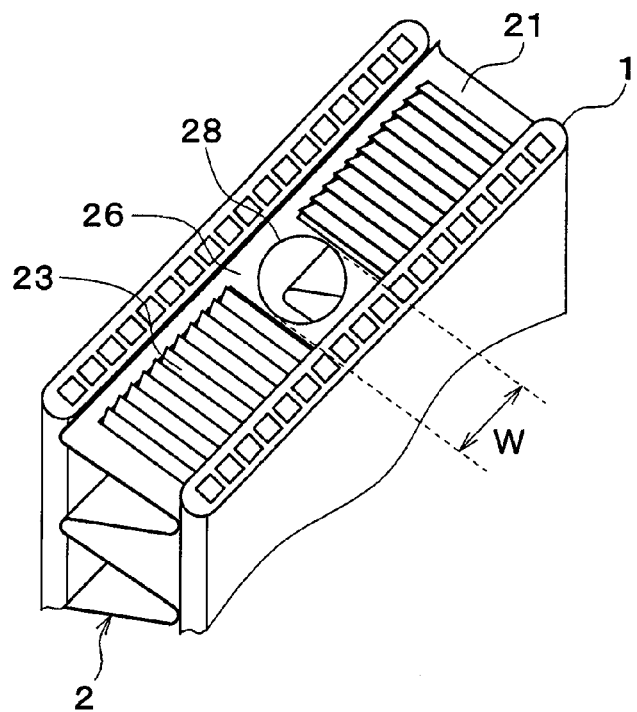
FIG. 12 is an enlarged perspective view illustrating an outdoor heat exchanger according to a second embodiment.

As depicted in FIG. 12, in the present embodiment, the deflecting section 26 has a circular through hole 28, of portions (the upstream-side planar section 24, the downstream-side planar section 25, and the deflecting section 26) of a planar section 21 in which the shortest distance L becomes the maximum. The through hole 28 of the present embodiment corresponds to the clearance in the present disclosure. In addition, a diameter of the through hole 28 corresponds to the slit width W.

According to the present embodiment, a freezing load can be released from the through hole 28 by defining the through hole 28 in the planar section 21 of a fin 2. Therefore, similar effects to those of the above first embodiment can be obtained.

Third Embodiment

A description will be made on a third embodiment on the basis of FIG. 13. The third embodiment differs from the above second embodiment in a point that a through hole 28 has a triangular shape.

Figure 13:
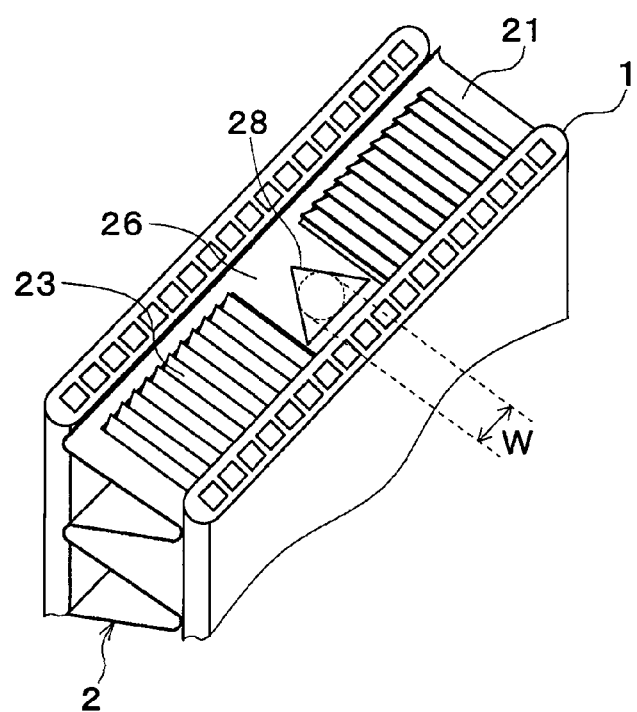
FIG. 13 is an enlarged perspective view illustrating an outdoor heat exchanger according to a third embodiment.

As depicted in FIG. 13, in the present embodiment, of portions of a planar section 21 (an upstream-side planar section 24, a downstream-side planar section 25, and a deflecting section 26) in which the shortest distance L becomes the maximum, the deflecting section 26 has the triangular through hole 28. At this time, a diameter of an inscribed circle of the through hole 28 corresponds to the slit width W. According to the present embodiment, a freezing load can be released from the through hole 28 by defining the through hole 28 in the planar section 21 of the fin 2. Therefore, similar effects to those of the above first embodiment can be obtained.

Fourth Embodiment

A description will be made on a fourth embodiment on the basis of FIG. 14. The fourth embodiment differs from the above first embodiment in a point that a clearance is constructed of a gap 29 between two fins 2.

Figure 14:
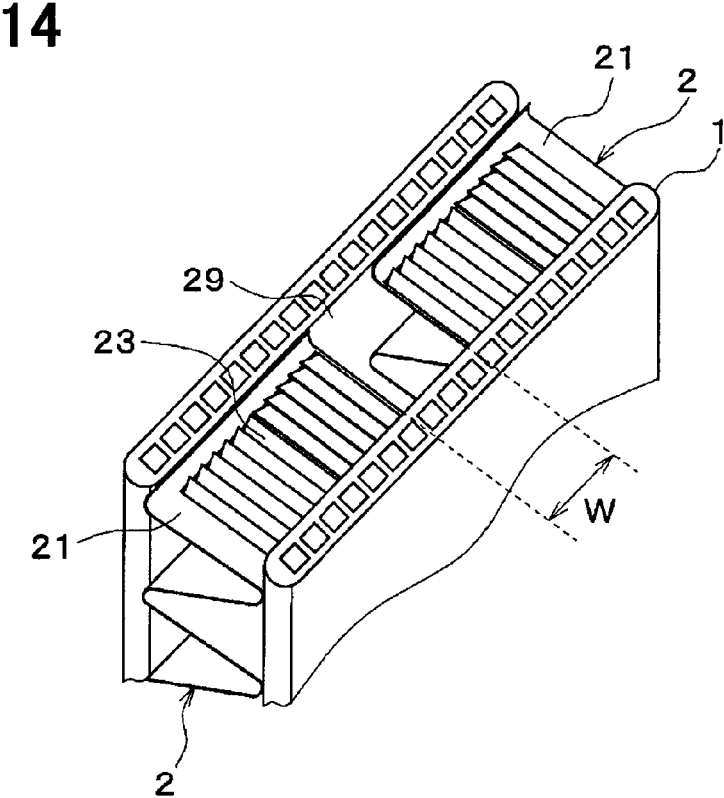
FIG. 14 is an enlarged perspective view illustrating an outdoor heat exchanger according to a fourth embodiment.

As depicted in FIG. 14, in the present embodiment, the two fins 2 are arranged in an airflow direction X1. The two fins 2 are arranged with the gap 29 being provided therebetween. The clearance is constructed of the gap 29 between the two fins 2. At this time, length of the gap 29 between the two fins 2 in the airflow direction X1 corresponds to the slit width W.

According to the present embodiment, a freezing load can be released from the gap 29 by providing the gap 29 between the two fins 2. Therefore, similar effects to those of the above first embodiment can be obtained.

Fifth Embodiment

A description will be made on a fifth embodiment on the basis of FIG. 15. The fifth embodiment differs from the above first embodiment in a point that plural deflecting sections 26 are provided in a planar section 21 of a fin 2.

Figure 15:
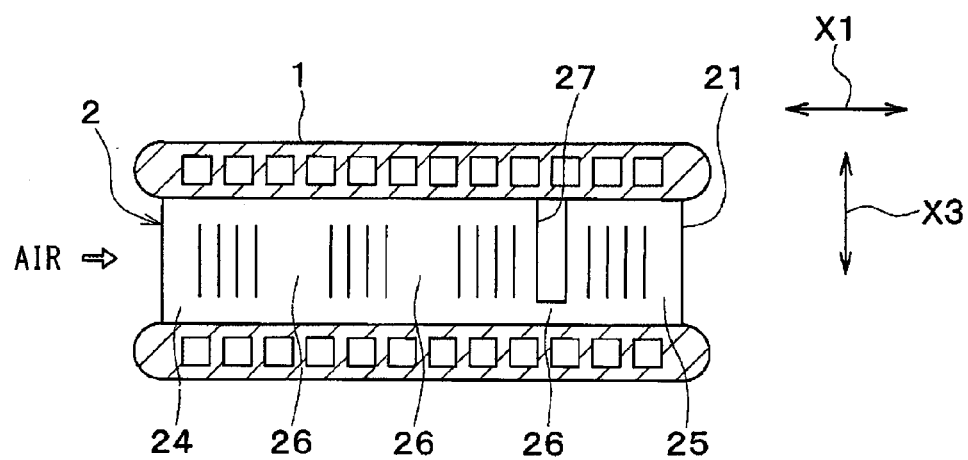
FIG. 15 is an enlarged perspective view illustrating an outdoor heat exchanger according to a fifth embodiment.

As depicted in FIG. 15, in the present embodiment, the plural (three in this example) deflecting sections 26 are provided in the planar section 21 of the fin 2. The deflecting sections 26 are arranged at equally spaced intervals in the planar section 21. Of the three deflecting sections 26, the deflecting section 26 on the lowermost stream side in the airflow has a slit 27.

Because heat of the air is less likely to be transferred to the deflecting section 26 on the lowermost stream side of the plural deflecting sections 26 in the airflow, non-freezing condensed water is likely to exist during freezing, and thus a freezing load is likely to be increased. On the contrary to the above, by providing the slit 27 in the deflecting section 26 on the airflow lowermost stream side of the plural deflecting sections 26 as in the present embodiment, the freezing load can be released from the slit 27. Therefore, the freezing load can be released from a portion of the planar section 21 where the tube 1 is likely to be fractured at a time when the freezing load is applied thereto.

Sixth Embodiment

A description will be made on a sixth embodiment on the basis of FIG. 16. The sixth embodiment differs from the above fourth embodiment in a point that the outdoor heat exchanger is a cold storage heat exchanger that: stores cold heat by solidifying a cold storage material at a time when a refrigerant is evaporated to exert an endothermic action; and releases the stored cold heat at a time when the cold storage material melts.

Figure 16:
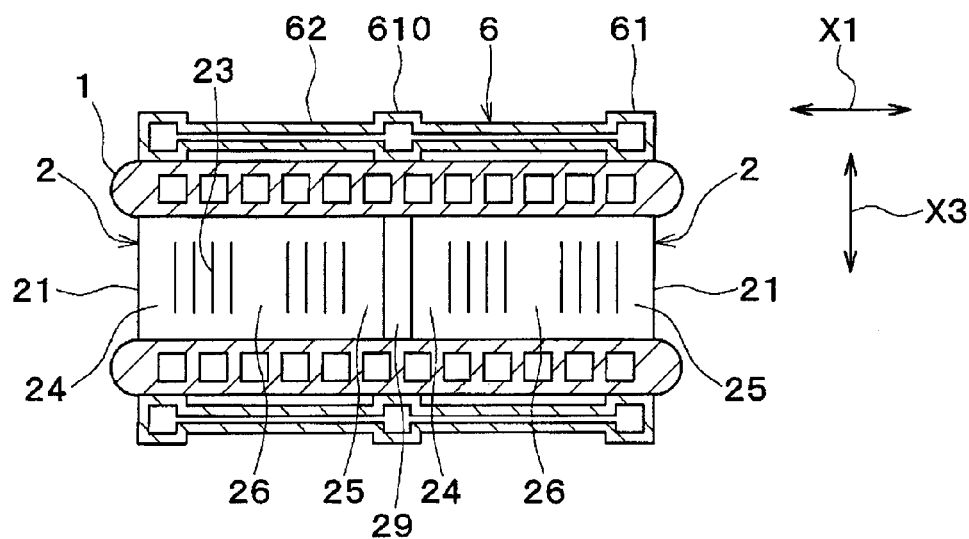
FIG. 16 is an enlarged perspective view illustrating an outdoor heat exchanger according to a sixth embodiment.

As depicted in FIG. 16, the outdoor heat exchanger of the present embodiment has a cold storage material container 6 that partitions rooms for accommodating the cold storage material. The cold storage material container 6 is joined to a tube 1.

More specifically, the cold storage material container 6 has: three room sections 61, each of which has a substantially square cross section when seen from a tube longitudinal direction X2; and two passage sections 62 for connecting the room sections 61. The room section 61 has a larger volume than the passage section 62. The three room sections 61 are arranged in the airflow direction X1.

The three room sections 61 are arranged with an interval being provided between two each thereof. The adjacent two room sections 61 are connected by the passage section 62. Accordingly, the three room sections 61 communicate with each other via the passage sections 62. While the passage sections 62 are joined to the tube 1, a gap is provided between the passage section 62 and the tube 1.

Of the three room sections 61, the room section 61 (hereinafter, referred to as a central room section 610) that is arranged between the two room sections 61 is joined to a central section of the tube 1 in an airflow direction. In detail, when seen from a tube stacking direction X3, the central room section 610 overlaps a gap 29 (a clearance) between two fins 2.

As it has been described so far, in the present embodiment, the cold storage material container 6 (the central room section 610) is provided to overlap the gap 29 between the two fins 2 when seen from the tube stacking direction X3. Thus, a heat load can be added to the gap 29 between the two fins 2 during freezing. In this way, non-freezing condensed water can be restricted from remaining on an inner side of a core section 3 during freezing. Therefore, occurrence of a freeze fracture to the tube 1 or the fin 2 can further be restricted.

Seventh Embodiment

A description will be made on a seventh embodiment on the basis of FIG. 17. The seventh embodiment differs from the above fourth embodiment in a point that a recessed section 11 is provided in a tube 1.

Figure 17:
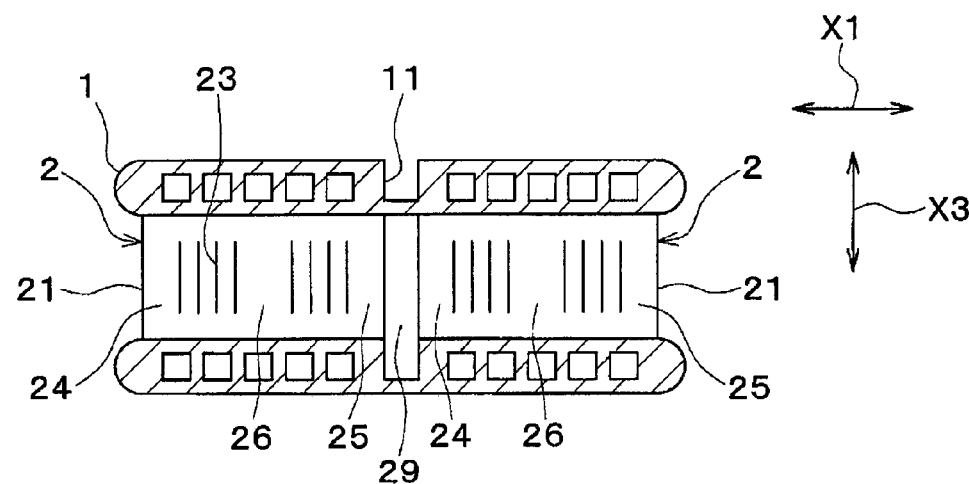
FIG. 17 is an enlarged perspective view illustrating an outdoor heat exchanger according to a seventh embodiment.

As depicted in FIG. 17, in the present embodiment, the recessed section 11 that is recessed in a tube stacking direction X3 is provided in a central section of the tube 1 in an airflow direction. When seen from the tube stacking direction X3, the recessed section 11 overlaps a gap 29 (a clearance) between two fins 2. That is, the recessed section 11 is provided in a portion of the tube 1 that opposes the gap 29.

According to the above, a freezing load can be released from the gap 29 between the two fins 2 toward the recessed section 11. Thus, the freezing load can further easily be released. Therefore, occurrence of a freeze fracture to the tube 1 or the fin 2 can further be restricted.

Eighth Embodiment

A description will be made on an eighth embodiment on the basis of FIG. 18 and FIG. 19. The eighth embodiment differs from the above first embodiment in a point that plural deflecting sections 26 are provided in a planar section 21 of a fin 2.

Figure 18:
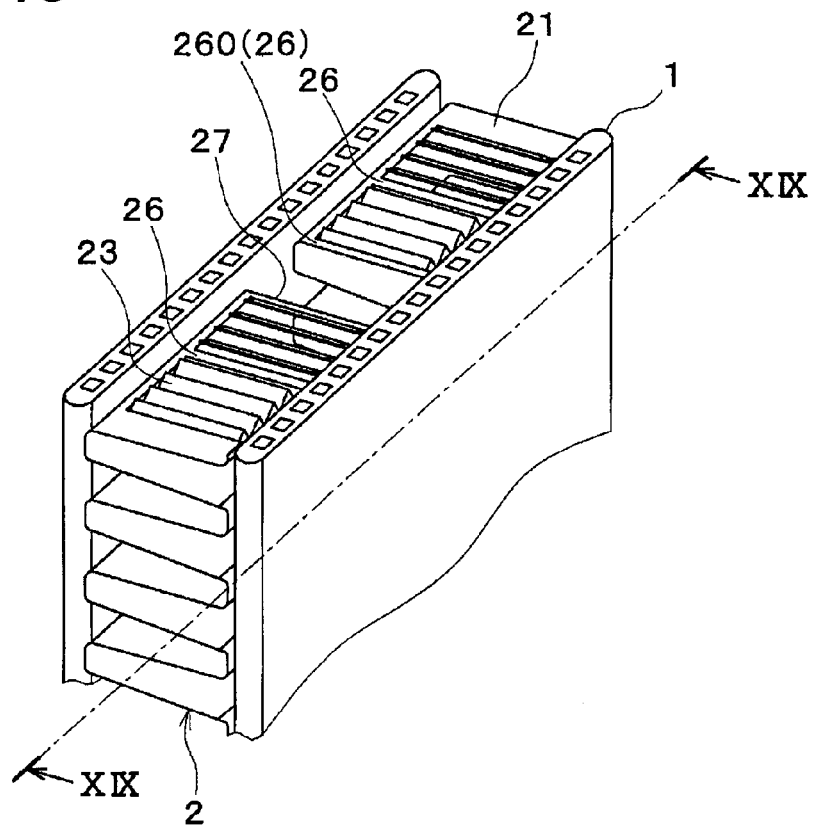
FIG. 18 is an enlarged perspective view illustrating an outdoor heat exchanger according to an eighth embodiment.
Figure 19:
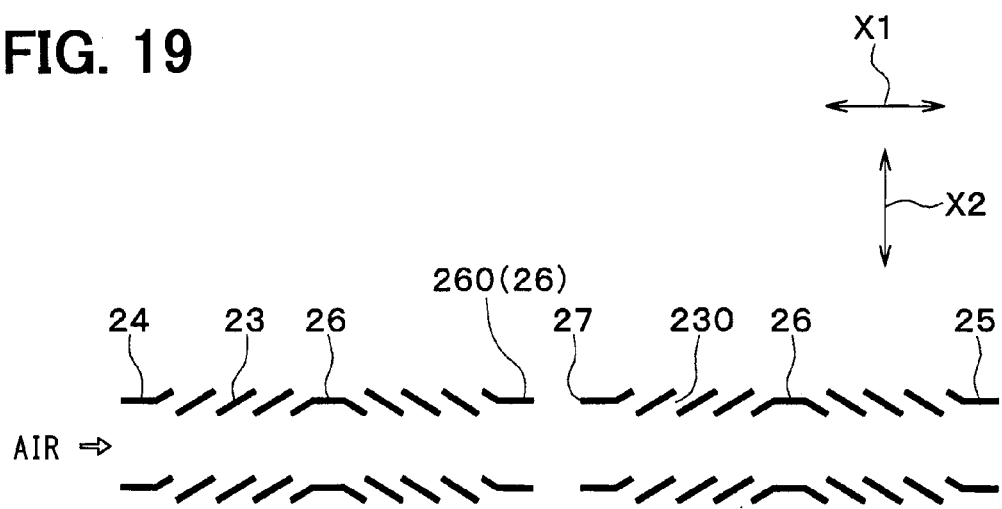
FIG. 19 is a cross-sectional view taken along a line XIX-XIX of FIG. 18.

As depicted in FIG. 18 and FIG. 19, in the present embodiment, the plural (three in this example) deflecting sections 26 are provided in the planar section 21 of the fin 2. Louvers 23 are configured that a cutting and raising direction thereof is reversed at each of the deflecting sections 26. Of the plural deflecting sections 26, the deflecting section 26 that is arranged in a portion where a distance from an end of the planar section 21 in an airflow direction X1 becomes the maximum, that is, the deflecting section 26 that is arranged in a central section of the planar section 21 in the airflow direction X1 will hereinafter be referred to as a central deflecting section 260.

The central deflecting section 260 is provided such that length thereof in the airflow direction X1 is longer than length of the other deflecting sections 26. Of the plural deflecting sections 26, the central deflecting section 260 has the slit 27; however, the other deflecting sections 26 has no slit 27.

According to the present embodiment, a freezing load can be released from the slit 27 by providing the slit 27 in the planar section 21 of the fin 2, more specifically, in the central deflecting section 260. Therefore, similar effects to those of the above first embodiment can be obtained.

Other Embodiment

It should be appreciated that the present disclosure is not limited to the embodiments described above and can be modified appropriately within the scope of the appended claims. The embodiments above are not irrelevant to one another and can be combined appropriately unless a combination is obviously impossible.

In the above embodiments, the slit 27 or the through hole 28 is provided in the deflecting section 26 among the upstream-side planar section 24, the downstream-side planar section 25, and the deflecting section 26 as the portions of the planar section 21 where the shortest distance L becomes the maximum. However, the portion provided with the slit 27 or the through hole 28 is not limited thereto.

For example, the slit 27 or the through hole 28 may be provided in either the upstream-side planar section 24 or the downstream-side planar section 25, or may be provided in both of the upstream-side planar section 24 and the downstream-side planar section 25. In addition, the slit 27 or the through hole 28 may be provided in two or more positions of the upstream-side planar section 24, the downstream-side planar section 25, and the deflecting section 26.

Furthermore, in addition to provision in at least one position of the upstream-side planar section 24, the downstream-side planar section 25, and the deflecting section 26 as the portions of the planar section 21 where the shortest distance L becomes the maximum, the slit 27 or the through hole 28 may also be provided in another portion of the planar section 21 (a portion of the planar section 21 where the shortest distance L does not become the maximum).

In the above fifth embodiment, the slit 27 is provided in the deflecting section 26 on the airflow lowermost stream side of the plural deflecting sections 26. In addition, in the above eighth embodiment, the slit 27 is provided in the central deflecting section 260. However, the portions provided with the slit 27 are not limited thereto. For example, the slit 27 may be provided in all of the plural deflecting sections 26, or may be provided at arbitrary positions in the plural deflecting sections 26.

In the above embodiments, the upstream louver group 23c and the downstream louver group 23d are provided such that the cutting and raising directions of the louvers 23, which belong thereto, are opposite (reversed). However, the cutting and raising directions of the louvers 23 are not limited thereto. For example, the plural louvers 23 may be provided to be laterally symmetrical about the center line C1 of the planar section 21 in the airflow direction X1. In this case, even when the louvers 23 that belong to the upstream louver group 23c and the louvers 23 that belong to the downstream louver group 23d have the same shape, moldability can be improved.

In the above embodiments, the heat exchanger according to the present disclosure is applied to the outdoor heat exchanger that functions as the evaporator for exchanging the heat of the low-pressure refrigerant with the ambient air to cause the evaporation thereof in the heat pump cycle. However, the application of the heat exchanger is not limited thereto. For example, the heat exchanger according to the present disclosure may be applied to a heat radiator for radiating heat of an antifreeze solution (LLC, for example) to the ambient air.

What is claimed is:

1. A heat exchanger comprising:
a plurality of tubes stacked with each other, through which a first fluid flows; and
a fin joined to the tube to increase a heat exchange area with a second fluid flowing around the tube, wherein
a cross-section of the fin that is perpendicular to a flow direction of the second fluid being shaped in a wave shape that has: a plurality of planar sections substantially parallel to the flow direction of the second fluid; and a top for connecting between the adjacent planar sections,
a surface temperature of at least one of the tube and the fin possibly becoming a freezing point or lower,
a clearance is defined in the planar section of the fin, and
a portion of the fin where the shortest distance from a center line between the adjacent planar sections becomes the maximum is defined as a furthest section in a cross-section that is perpendicular to a stacking direction of the tubes, and
the clearance is located in one furthest section or at least one of a plurality of furthest sections, and
the clearance overlaps the tube when seen from the stacking direction of the tubes.

2. The heat exchanger according to claim 1, wherein, when a pitch of the fin is set as a fin pitch Fp and when a length of the clearance in the flow direction of the second fluid is set as a clearance width W, the fin pitch and the clearance width satisfy a relationship of W>0.414×Fp+0.0575.

3. The heat exchanger according to claim 1, wherein
the planar section integrally has a louver that is cut and raised at a predetermined cutting and raising angle with respect to the planar section when seen from the stacking direction of the tubes,
when an angle defined between the adjacent planar sections connected by the top is defined as α, when a length of the fin in the stacking direction of the tubes is defined as FH,
when the cutting and raising angle of the louver is defined as θ, when an average value of a length of the louver in a flow direction of air flowing on a surface of the louver is defined as Lp, when "a" indicates Equation 2, and when "b" indicates Equation 3, and $$W \geq \frac{1.8a^2 \times \sin\alpha}{(2a+b)} - Lp \times \sin\theta \quad \text{[Equation 1]}$$

$$a = \sqrt{\left(\frac{Fp}{4} + \frac{FH}{2} \times \tan\frac{\alpha}{2}\right)^2 + \left(\frac{FH}{2} + \frac{Fp}{4} \times \frac{1}{\tan\frac{\alpha}{2}}\right)^2} \quad \text{[Equation 2]}$$

$$b = \frac{Fp}{2} + FH \times \tan\frac{\alpha}{2} \quad \text{[Equation 3]}$$

a clearance width W that is a length of the clearance in the flow direction of the second fluid satisfies a relationship of Equation 1.

4. The heat exchanger according to claim 1, wherein
the planar section has a plurality of louvers that are cut and raised at a predetermined cutting and raising angle with respect to the planar section that are arranged along the flow direction of the second fluid,
a portion of the planar section between the plural louvers has a deflecting section substantially parallel to the flow direction of the second fluid, and
the clearance is defined in the one deflecting section or at least one of the plurality of deflecting sections.

5. The heat exchanger according to claim 1, wherein
the clearance is defined in a portion of the planar section where a distance from an end of the tube in the flow direction of the second fluid becomes the maximum.

6. The heat exchanger according to claim 4, wherein
the clearance is defined in the deflecting section that is located at the farthest position from an end of the fin upstream side in the flow direction of the second fluid.

7. The heat exchanger according to claim 1, wherein
the clearance is constructed of a slit defined in the planar section.

8. The heat exchanger according to claim 1, wherein
the clearance is constructed of a through hole defined in the planar section.

9. The heat exchanger according to claim 1, wherein
the fin is one of a plurality of fins arranged in the flow direction of the second fluid,
the plurality of fins are arranged with a gap being provided therebetween, and
the clearance is constructed of the gap between the adjacent fins.

10. The heat exchanger according to claim 1, wherein
the fin is arranged such that an upstream side and a downstream side thereof in the flow direction of the second fluid have symmetrical shapes about the clearance.

11. The heat exchanger according to claim 1, wherein
the tube is arranged such that the first fluid flows in a vertical direction.

12. The heat exchanger according to claim 1 wherein
the tube is arranged such that the first fluid flows in an up-down direction.

13. A heat exchanger comprising:
a plurality of tubes stacked with each other, through which a first fluid flows; and
a fin joined to the tube to increase a heat exchange area with a second fluid flowing around the tube, wherein
a cross-section of the fin that is perpendicular to a flow direction of the second fluid being shaped in a wave shape that has: a plurality of planar sections substantially parallel to the flow direction of the second fluid; and a top for connecting between the adjacent planar sections,
a surface temperature of at least one of the tube and the fin possibly becoming a freezing point or lower,
a clearance is defined in the planar section of the fin,
a portion of the fin where the shortest distance from a center line between the adjacent planar sections becomes the maximum is defined as a furthest section in a cross-section that is perpendicular to a stacking direction of the tubes,
the clearance is located in one furthest section or at least one of a plurality of furthest sections,
each of the tubes includes a plurality of first fluid passages through which the first fluid flows,
each of the tubes has two flat surfaces opposing to each other through the first fluid passages,
the clearance overlaps at least one of the first fluid passages when seen from the stacking direction of the tubes,
the fin has an upstream side and a downstream side of the clearance in the flow direction of the second fluid, and
each of the upstream side and the downstream side is joined to the flat surface of the tube.

* * * * *